United States Patent
Haag et al.

(10) Patent No.: US 8,671,533 B2
(45) Date of Patent: Mar. 18, 2014

(54) GRIPPER DEVICE FOR MOUNTING RUBBER ELASTIC RINGS AND FINGER FOR A GRIPPER DEVICE OF THIS TYPE

(75) Inventors: Matthias Haag, Stuttgart (DE); Ralf Winkler, Nordheim (DE); Andre Hermes, Nordheim (DE)

(73) Assignee: Schunk GmbH & Co. KG Spann-und Greiftechnik, Lauffen am Neckar (DE)

( * ) Notice: Subject to any disclaimer, the term of this patent is extended or adjusted under 35 U.S.C. 154(b) by 1118 days.

(21) Appl. No.: 11/837,110

(22) Filed: Aug. 10, 2007

(65) Prior Publication Data

US 2007/0271753 A1 Nov. 29, 2007

Related U.S. Application Data

(63) Continuation of application No. PCT/EP2006/000656, filed on Jan. 26, 2006.

(30) Foreign Application Priority Data

Feb. 10, 2005 (DE) .......................... 10 2005 007 932

(51) Int. Cl.
*B23P 13/00* (2006.01)

(52) U.S. Cl.
USPC ................................ 29/235; 229/252; 269/20

(58) Field of Classification Search
USPC ............. 29/235, 281.1; 269/20, 25, 152, 305, 269/32, 228; 92/62, 59, 117 R; 91/173, 520; 294/63.2; 65/314
See application file for complete search history.

(56) References Cited

U.S. PATENT DOCUMENTS

| 2,146,346 | A | * | 2/1939 | Nelson ........................ 92/117 R |
| 4,775,135 | A | * | 10/1988 | Leibinger et al. ............. 269/303 |
| 5,201,501 | A | * | 4/1993 | Fassler ............................ 269/32 |
| 5,941,513 | A | * | 8/1999 | Moilanen et al. ............... 269/32 |
| 6,273,408 | B1 | * | 8/2001 | Moilanen et al. ............... 269/32 |
| 6,357,735 | B2 | * | 3/2002 | Haverinen ...................... 269/43 |
| 6,575,512 | B2 | * | 6/2003 | Moilanen et al. ............... 294/88 |

(Continued)

FOREIGN PATENT DOCUMENTS

AT 385 934 B 6/1988

(Continued)

OTHER PUBLICATIONS

International Search Report.
Examination Report from Priority Application.

*Primary Examiner* — Lee D Wilson
(74) *Attorney, Agent, or Firm* — Brinks Gilson & Lione (57) ABSTRACT

A gripper device (10) is provided for mounting rubber elastic rings (5) on the inner wall (62) of a workpiece opening and/or on the exterior of a workpiece. The device includes a basic housing (12), forming jaws (14) that are displaced in relation to the basic housing (12) and bearing jaws (16). To displace the plate element together with the jaws that are located on the element in an axial direction, the element is provided with a piston (20) which engages in a piston cylinder (22) in the basic housing. The displacement of the jaws that are located on the plate element (18) is mechanically coupled by a common actuator (24) and the actuator (24) is driven by an actuator piston (25) that is located in the piston (20).

9 Claims, 8 Drawing Sheets (56) References Cited

U.S. PATENT DOCUMENTS

| | | | |
|---|---|---|---|
| 7,029,000 B2* | 4/2006 | Petit et al. | 269/47 |
| 7,290,760 B1* | 11/2007 | Lindsay et al. | 269/75 |
| 2004/0113343 A1* | 6/2004 | McIntosh et al. | 269/32 |
| 2007/0271753 A1* | 11/2007 | Haag et al. | 29/235 |

FOREIGN PATENT DOCUMENTS

| | | |
|---|---|---|
| DE | 40 36 863 C2 | 5/1992 |
| JP | 591151135 A | 7/1984 |
| JP | 60 161075 A | 8/1985 |
| WO | WO 2006/084577 A3 | 8/2006 |

* cited by examiner

GRIPPER DEVICE FOR MOUNTING RUBBER ELASTIC RINGS AND FINGER FOR A GRIPPER DEVICE OF THIS TYPE

CROSS-REFERENCE TO RELATED APPLICATIONS

This application is a continuation of International Application No. PCT/EP2006/000656 filed on Jan. 26, 2006, which claims the benefit of DE 10 2005 007 932.6, filed Feb. 10, 2005. The disclosures of the above applications are incorporated herein by reference.

FIELD

The disclosure relates to a gripper device for mounting rubber elastic rings.

BACKGROUND

The statements in this section merely provide background information related to the present disclosure and may not constitute prior art.

The mounting of rubber elastic rings, for example o-rings, has in practical applications proven to be quite costly. When mounting rubber elastic rings to the outer wall of a work piece, the rubber elastic ring must be slipped over the outer wall of a work piece to the proper position. When mounting rubber elastic rings to the inner wall of a work piece opening, the rubber elastic ring must be inserted into this work piece opening.

A tool for mounting o-rings in bore keyways is known from DE 40 36 863 C2, where power and spreading arms, which grip an O-ring, can be radially controlled by a piston/cylinder unit that is assigned to the respective arm. Such a tool is comparatively large in a radial direction and is therefore not suited for installations in handling units such as robot arms.

AT 385 934 B introduced a device for inserting rings in keyways where arms are positioned to pivot through turnable shafts.

JP 59115135 A also introduced a device for inserting rings in keyways, where a ring is expanded and mounted by pivoting on several coupled levers.

SUMMARY

The underlying task of the present disclosure is to make a gripper device and finger for a gripper device available, which can automatically mount rubber elastic rings in both a simple and functional manner.

This task is achieved by means of a gripper device with the characteristics of claim 1.

Such a device allows the mounting of rubber elastic rings on the inside as well as on the outside. Due to the independent movability of the forming jaws opposite to the bearing jaws, a particular ring can be expanded by means of the forming and/or bearing jaws and held in place in a radial inward direction. Due to the axial displacement of the jaws by the linear actuator, the jaws can be retracted from their mounting position for the final mounting of the rings.

As a result of the jaws that are positioned on the plate element, being for one thing mechanically coupled through a common actuator, and the actuator for another thing being powered by an actuator piston, which is positioned in the linear piston, there results a compact installation device, which requires only one common actuator for the individual jaws.

In the gripper device according to the present disclosure, the motion coupling of the jaws, which are not positioned on the plate element, can be accomplished either electrically and/or pneumatically.

The linear piston according to the present disclosure can include a set cylinder to receive the actuator piston. The actuator piston then acts upon the set cylinder on the side of the linear piston and can be pressurized on at least one side. A spring element can, for example, generate a reset force of the actuator piston.

The linear piston can comprise an at least partially sleeve-like piston rod, which is open on one side and forms the set cylinder. This embodiment is preferred because the diameter of the sleeve-like piston rod can, for example, be larger than the pressurized linear section of the linear piston, which displaces the linear piston in an axial direction when pressurized.

Another preferred design provides that the plate element has a guide opening for the actuator piston, its actuator piston rod and/or for the actuator which is connected to the actuator piston. The plate element in addition to the function of supporting the respective jaws then assumes another function that is the axial guide for the actuator piston or the actuator, respectively. In the preferred version, the guide opening is positioned in the median longitudinal axis of the plate element.

According to another version, the actuator can be mechanically coupled by setting levers or through pulls with the respective jaws that are positioned on the plate element.

As a result, in an axial displacement of the actuator the respective jaws are displaced in a radial direction towards or away from one another.

Accordingly, the jaws, which are not positioned on the plate element, can be coupled through suitable setting levers or pulls with a pressure pin, which continues in an axial direction. An axial displacement of the respective pressure pin will cause a radial displacement of the respective jaw.

The pressure pins can be displaced in an axial direction through a jointly controllable pressure pin piston. Such an embodiment of the present disclosure logically provides for a pneumatic coupling between the individual pressure pins or jaws, respectively.

It is furthermore advantageous that, when the pressure pins enclose the setting threading sections in such a way that by turning the control units, which are fastened onto the setting threading sections, the axial length of the pressure pins changes and thus causes a linear displacement. This can lastly serve to adjust the stroke of the jaws, which are coupled with the pressure pins.

The common travel adjustment of the individual pressure pins can, according to the present disclosure, be accomplished in such a way that the control units always have an outer pinion and that the outer pinions can be adjusted together through an actuator ring, which combs over the outer pinion and has a particular gearing. This has the advantage that a synchronized adjustment of the strokes can be achieved.

The individual forming jaws and/or the individual bearing jaws in such a gripper device are advantageously positioned on an individual joint circular path. The centers of the two circular paths are in the preferred version positioned in the median longitudinal axis of the gripper device. The forming jaws are thus positioned on a circular path, which is concentrically positioned in relation to the circular path that is configured by the bearing jaws. This may cause a symmetrical expanding or an inward radial deformation of the rings.

The bearing jaw is advantageously always positioned between two forming jaws and one forming jaw is always positioned between two bearing jaws. A bearing jaw is consequently always positioned alternatively next to a forming jaw. An advantageous version can therefore provide for three bearing jaws and three forming jaws.

The gripper device according to the present disclosure can therefore incorporate a first drive for the radial displacement of the forming jaws, a second drive for the radial displacement of the bearing jaws, and a third drive for the axial displacement of the bearing jaws and/or forming jaws, whereby the individual drives can always be controlled independent of each other.

Forming fingers and/or bearing fingers may be advantageously positioned on the forming jaws and/or bearing jaws of a gripper device according to the present disclosure.

Such fingers according to the present disclosure serve to position a bearing jaw and/or forming jaw of a particular gripper device according to the present disclosure. The finger in this process may be a bearing finger for the positioning on a bearing jaw or a forming finger for the positioning on a forming jaw of a gripper device, in particular of a gripper device according to the present disclosure.

The fingers are advantageously round or curved in the surface area, where a rubber elastic ring will make contact. This will, on the one hand, ensure that when the rings are expanded the fingers do not cause unwanted notches, which could lead to a damaging of the rings when they are being expanded. On the other hand, this can also cause the ring to be stripped of the finger in an axial direction without the finger taking the ring along unwantedly in an axial direction.

In order to prevent that the ring can be moved too far on the finger in an axial direction, the finger may have a ridge to support the ring in an axial direction. Such a ridge advantageously extends in a radial direction. Depending on the intended use of the finger, the ridge may be positioned radially on the inside (forming finger inner mounting) or radially on the outside (forming finger outer mounting).

It is thereby advantageous if the space, which exists in an axial direction between the ridge and the free abutting face of the finger, is larger than or equal to the thickness of the ring. This will ensure that the ring can be safely received by the fingers.

A particularly advantageous finger, which is configured as a bearing finger, can be characterized by, in order to support the ring, it having a radial outer bearing section, which continues, at least in sections, largely circularly around the median longitudinal axis of the gripper device and curved side sections, which continue from the bearing section tangentially from the side, at least in sections in a radial inner direction to the median longitudinal axis of the gripper device. This serves to ensure that particularly during inner mounting of the ring, the ring can be safely redirected around the bearing sections and the side sections. The bearing section and the side section are therefore advantageously positioned on a plane, which in relation to the median longitudinal axis of the gripper device continues at least in a continuously vertical direction.

It can be advantageous in this regard if the side sections are positioned in a groove-like recess of the bearing finger and/or are delimited in an axial direction by two each other opposing sidewalls. This has the advantage that a slipping of the ring, which is redirected in an axial direction around the bearing section and the side sections, can be safely prevented. The ring sections which rest in the side sections cannot be moved in an axial direction because of the opposite side walls.

Rotating rollers can be advantageously provided in the area between the bearing section and the side sections. The rollers are thereby positioned in the ring plane or the rotational axis of the rollers' runs parallel to the longitudinal center axis of the gripper device. This has the advantage that when turning the bearing finger around the center longitudinal axis of the gripper device, any undesired movement of the ring in relation to the work piece can be eliminated, as provided according to Step e3).

It is also advantageous if the bearing fingers according to the present disclosure exhibit in a top view a circular, segment-like contour in such a way that two bearing fingers, which are positioned at the gripper device adjacent to each other, each form a passage for a forming finger in a radial direction. The forming finger can thereby be displaced in the passage in a radial direction. In the event that protruding sidewalls are provided in the area of side sections, the free sides of the sidewalls facing each other form the passage. The passage is thereby in a radially inward position of the bearing fingers slightly wider than the forming finger. This guarantees additional guidance for the forming fingers.

A procedure for the internal mounting of a rubber elastic ring on an inner wall of a work piece opening by means of a gripper device according to the present disclosure can be characterized by the following steps:
a) Receiving the ring between a bearing finger, which, in relation to the ring is in a radially inward position and a forming finger, which is in a radially outward position;
b) Displacement of the forming finger in a radially inward direction, so that the ring is redirected around the bearing finger;
c) Positioning of the ring into the work piece opening;
d) Displacement of the bearing finger in a radially outward direction in such a way that the ring at the interior wall of the work piece opening makes contact on that side, which is opposite of the bearing finger;
e) Axially backward displacement of the forming fingers and
f) Axially backward displacement of the bearing fingers.

Such a procedure has the advantage that the rubber elastic ring in steps a) and b) is held between the bearing fingers and forming fingers in a manner that prevents a loss and the ring can thus be inserted into the work piece opening. Step d) serves to position the ring at the exact position where it is held due to its positioning. The forming fingers can then be retracted in an axial direction without the ring changing its relative position in respect to the inner wall of the work piece opening. The ring flexes favorably during the backward displacement of the forming fingers in a radially outward direction and makes contact in a widespread manner at the inner wall of the work piece opening. According to step f), the bearing fingers can finally be displaced in a backward direction. The entire gripper device can then be displaced from its mounting position to a receiving position, where, for example, the next ring can be received.

All in all, this results in a procedure that allows a fully automatic, accurate and safe mounting of rings in work piece openings, such as bores or other penetrations in a work piece.

It can be provided, that following step e) and prior to step f), the following steps are additionally performed:
e1) displacement of the forming fingers in a radially inward and axially forward direction on the plane of the ring, and
e2) displacement of the forming fingers in a radially outward direction in such a way that the ring at the interior wall of the work piece opening makes contact on that side, which is opposite to the forming finger.

This will further ensure that the ring is pressed to the inner wall of the work piece opening by the forming fingers. It is therefore ensured that the ring sections, where the forming fingers contact the ring, will abut on the inner wall of the work piece opening with their entire surface.

It can also be provided, that following step e) and prior to step f), the following step is performed:

e3) Turning the bearing fingers and/or the gripper device around the median longitudinal axis in such a way that the ring makes contact on the inner wall of the workpiece opening with its entire surface.

The turning of the bearing fingers therefore ensures that the ring makes contact on the inner wall of the work piece opening with its entire surface.

It is conceivable that, prior to step e) and/or prior to step f), the forming fingers and/or bearing fingers are displaced in a radially inward direction and only then in an axially backward direction. This has the advantage that during the backward displacement of the fingers, the ring is not affected by forces which act transversely to the median longitudinal axis and which could deflect the ring from its assigned position.

A procedure for the outer mounting of a rubber elastic ring on an inner wall of a work piece opening by means of a gripper device according to the present disclosure can be characterized by the following steps:

a) Receiving the ring by bearing fingers and forming fingers, which in relation to the ring are in a radially inward position;
b) Displacement of the forming fingers and the bearing fingers in a radially outward direction so that the ring is expanded;
c) Positioning of the ring around the outer wall of a work piece;
d) Axially backward displacement of the bearing fingers and/or forming fingers in such a way that the ring makes contact sectionally at the outer wall of the work piece;
e) Axially backward displacement of the forming fingers and/or the bearing fingers.

This results in a more accurate and more secure automatic mounting of the ring on an outer wall of a work piece, such as a shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the disclosure may be well understood, there will now be described an embodiment thereof, given by way of example, reference being made to the accompanying drawing, in which:

FIG. 7 sets forth various steps 7.1-7.4 for the outer mounting of a rubber elastic ring.

Additional details and advantageous variations of the present disclosure can be found in the following detailed description, where the present disclosure is further explained and described by means of various embodiments exemplified by the illustrations.

DETAILED DESCRIPTION

The following description is merely exemplary in nature and is not intended to limit the present disclosure, application, or uses.

FIGS. 1 through 3 and 3a show a gripper device 10 according to the present disclousre for the mounting of rubber elastic rings on an inner wall of a work piece opening as well as for the mounting of rubber elastic rings on an outer wall of a work piece. The gripper device 10 comprises a basic housing 12 and forming jaws 14 and bearing jaws 16 that can be displaced in relation to the basic housing 12.

All three bearing jaws 16 are respectively coupled to one another in such a way that they are positioned centrically displaceable towards or away from one another. For this purpose, three individual actuators may be provided in housing 12 that are accordingly controlled for the joint displacement of the bearing jaws.

All three forming jaws 14 are also respectively coupled to one another in such a way that they are positioned jointly displaceable towards and away from one another, namely independent of the displacement process of the bearing jaws 16. The three forming jaws 14 are positioned on a common plate element 18, which can be clearly seen in FIG. 2 and 3a. The plate element 18 can thereby for the axial displacement of the forming jaws 14, in relation to the basic housing 12, be elevated or lowered, respectively. According to FIGS. 2, 3 and 3a, a piston 20 is therefore positioned at the plate element 18, which engages into the piston cylinder 22 on the side of the basic housing. The forming jaws 14 are coupled with a common actuator 24 for the coupling of the displacement process of the forming jaws 14.

Figure 3:
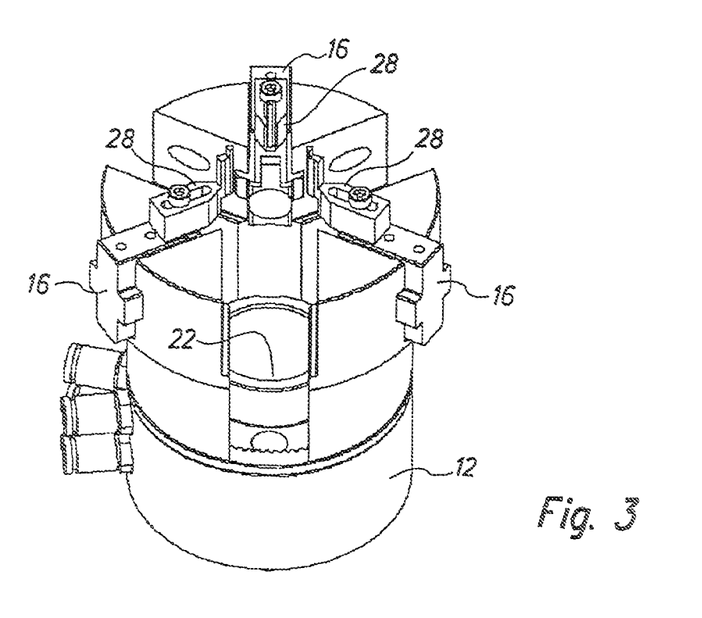
FIG. 3 illustrates the gripper device according to FIG. 1 without the lifting device.
Figure 3A:
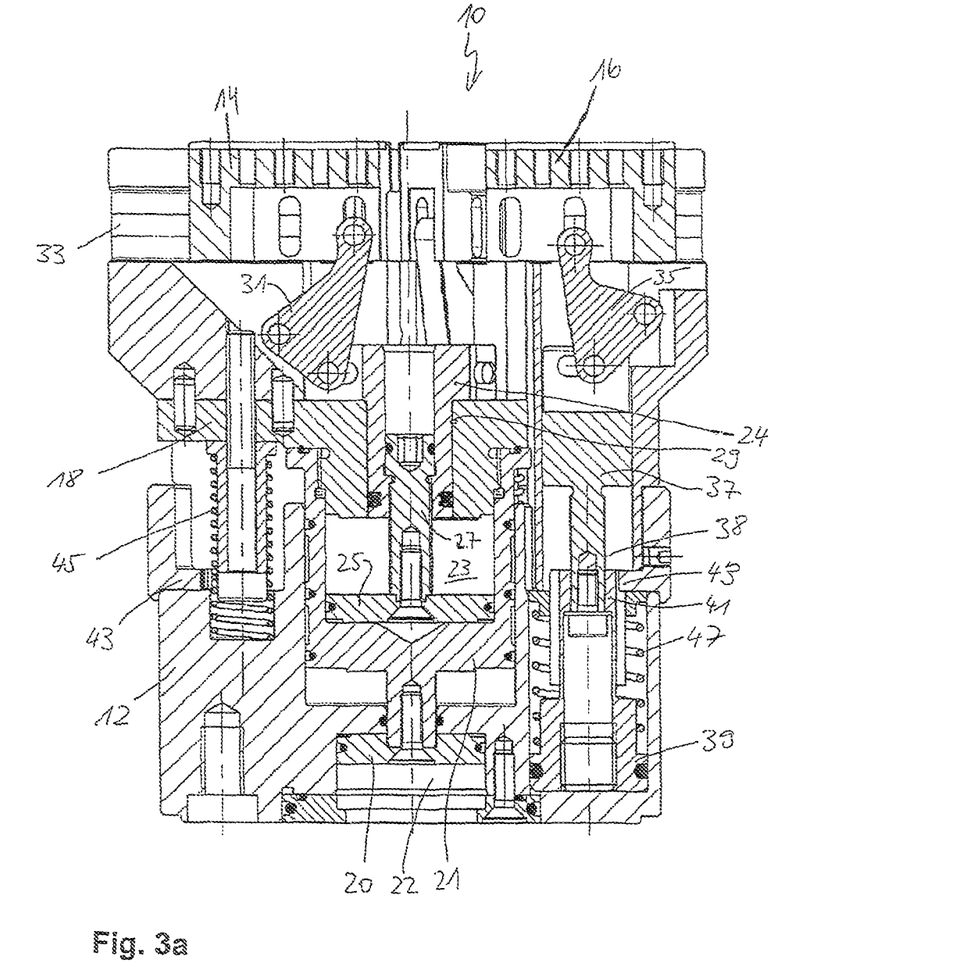
FIG. 3a illustrates the gripper device according to FIGS. 1, 2 and 3 in a longitudinal cross section.

FIG. 3a shows that the piston 20 is comprised of a piston rod 21, which is sleeve-like and open on one side. The piston rod 21 thereby forms an actuator cylinder 23 for an actuator piston 25, which is coupled with the actuator 24 through a connector element 27. The actuator 24 is therefore driven by an actuator piston 25, which is centrally positioned in the piston 20.

As is shown in FIG. 3a, the plate element 18 has a guide opening 29, which guides an actuator 24 in an axial direction.

As is further shown in FIG. 3a, the actuator 24 is coupled to the respective jaws 14 through setting levers 31. The setting levers 31 are thus positioned axially displaceable on the jaw guides 33 that are positioned on the plate element 18. The axial displacement of the actuator 24 causes a radial displacement of the respective jaws 14.

The jaws 16, which are not positioned at the plate element 18 and/or its guides 33, are also coupled through setting levers 35 with pressure pins 37, which continue in an axial direction. The pressure pins 37 can be pressurized by related pressure pin pistons 39, which causes a radial displacement of the jaws 16. Although individual pressure pins 37 are provided for each jaw 16, the individual pressure pin pistons, or the individual cylinders, respectively, are pneumatically connected to one another. This achieves a synchronized displacement of the pressure pins 37.

The individual pressure pins 37 comprise adjustment threading sections 38 in such a way that by turning the outer pinions 41, which are fastened on the setting threading sections 38, the axial length of the pressure pins 37 is changed, which thereby allows a linear displacement of the pressure pins 37 as well as of the related jaws 16. The individual outer pinions 41 of the pressure pins 37 are effectively connected through a setting ring 43, which combs across the outer pinion and has a particular gearing. A turning of the setting ring 43 therefore achieves an axially linear displacement in all pressure pins 37.

The gripper device 10 therefore provides a total of three drives that are operating independently of one another. First, the actuator piston 25 for the radial displacement of the jaws 14, second, the pressure pin pistons 39 for the radial displacement of the jaws 16 and, third, the piston 20 for the lowering and/or retracting of the jaws 14. The piston 20 is therefore only pressurized on one side, since the reset force can be delivered through spring elements 45. Accordingly, the pressure pin pistons 39 are only pressurized on one side since spring elements 47 for the delivery of a reset force are provided here as well.

In the gripper device according to the FIG. 1 through 3a, the forming jaws 14 are therefore displaceable independent of the bearing jaws 16, and the bearing jaws 16 are displaceable independent of the forming jaws 14 in a radial direction towards and away from one another. The forming jaws 14 can also be displaced in relation to the bearing jaws through the plate element 18 in an axial direction.

Figure 1:
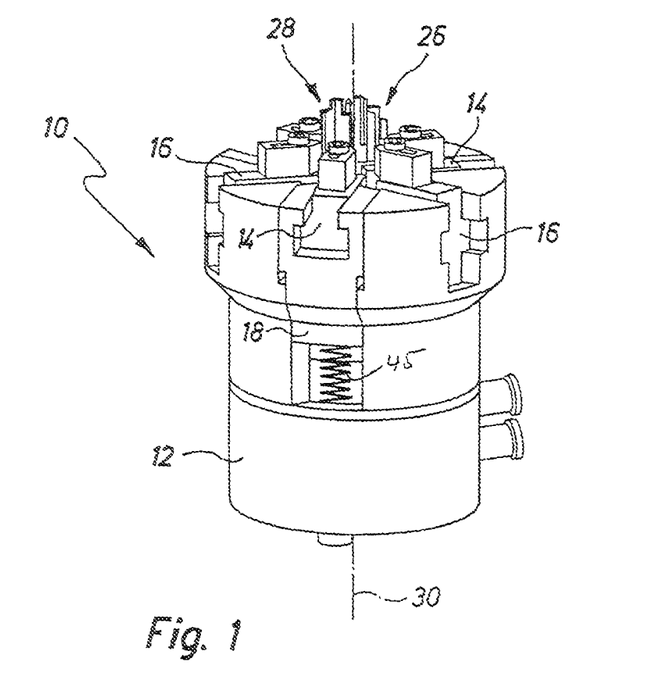
FIG. 1 is a gripper device according to the present disclosure.
Figure 2:
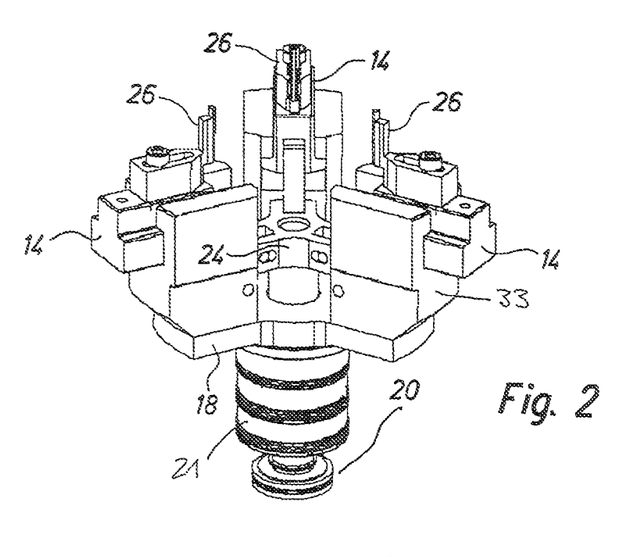
FIG. 2 is a lifting device of the gripper device according to FIG. 1 illustrated as individual component.

As can also be clearly seen in FIG. 1 through 3, fingers 26, 28 are positioned on the forming jaws 14 and the bearing jaws 16, whereas the fingers 26, 28, which are positioned on the forming jaws, are forming fingers and the fingers 28, which are positioned on the bearing jaws 16, are bearing fingers. Various types of usable fingers are shown in the FIG. 8 through 11 and will be described in detail later.

The gripper device 10 basically has a symmetrical structure in such a way that the bearing jaws 16 are positioned on a concentric circle surrounding the median longitudinal axis 30 of the gripper device 10. The forming jaws 14 are likewise concentrically positioned surrounding the median longitudinal axis 30. The three bearing fingers are always positioned equidistant to one another and always incorporate an angle of 120°. The forming fingers are likewise positioned equidistant and in respect of the median longitudinal axis 30 incorporate an angle of 120° as well.

Figure 4:
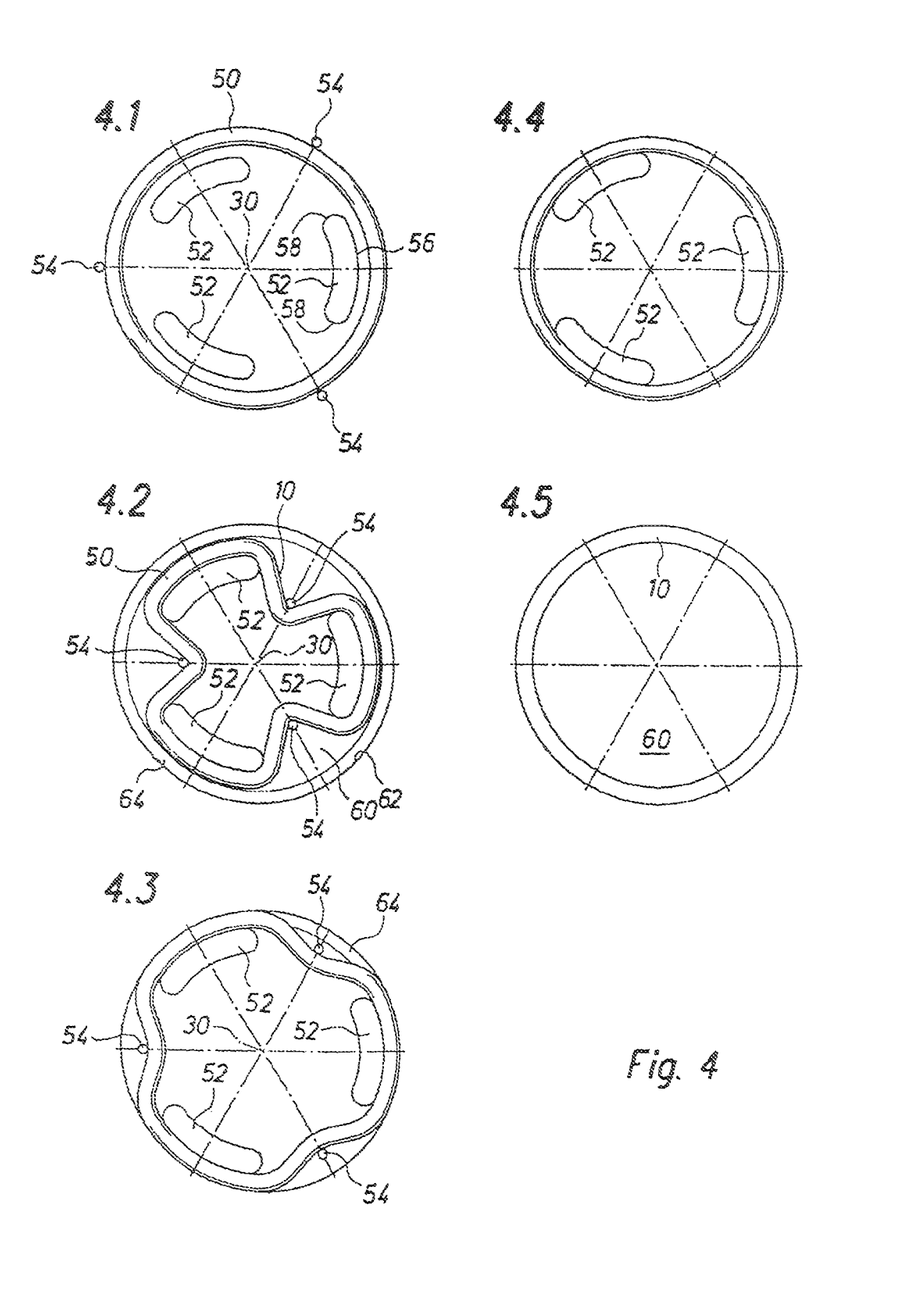
FIG. 4 sets forth various steps 4.1-4.5 for the inner mounting of a rubber elastic ring.

FIG. 4 shows various steps of a procedure for mounting of a rubber elastic ring to an inner wall of a work piece opening by means of a gripper device according to the FIG. 1 through 3.

The rubber elastic ring that is to be mounted is denoted in FIG. 4 through 7 with the reference sign 50.

The individual steps each show the rubber elastic ring 50 in a top view, that means vertically in relation to the median longitudinal axis 30 as well as the forming fingers 26 and/or the bearing fingers 28, which are on the same plane as the ring 50.

In step 4.1 of FIG. 4, the ring 10 is received between bearing fingers 52, which, in relation to the ring, are positioned radially inward, and forming fingers 54, which, in relation to the ring, are positioned radially outward. The forming fingers 54 are according to FIG. 4.2 in the next step displaced radially inward so that the ring 50 is sectionally redirected around the bearing fingers 52, which in FIG. 4 are kidney-shaped. The bearing fingers 52 thereby provide for a radially outward, sectionally largely circular contact section 56 that continues around the median longitudinal axis 30, as well as side sections 58, which continue tangentially sideways from the contact section 56, which in relation to the median longitudinal axis 30 is curved at least sectionally in a radial inner direction.

According to FIG. 4.2, the ring 10 rests on the contact sections 56 and the side sections 58. The ring that is thus expanded can, as is also illustrated in FIG. 4.2, be fitted into a work piece opening 60 of a work piece, which is sectionally illustrated in FIG. 4.2-4.5. The work piece opening 60 is thereby delimited by the inner wall 62. According to FIG. 4.2, a circumferential insertion 64 can be provided at the inner wall 62, into which a ring 10 must be fitted.

When the ring is equal to the plane of the insertion 64, the bearing fingers 52 are displaced in a radially outward direction, so that the ring makes contact at the inner wall 62 and/or in the insertion 64 at the area of the bearing finger 52. The forming fingers 54 can at the same time or thereafter also be displaced in a radially outward direction.

The forming fingers 54 are then axially displaced backwards, so that the ring 10 slips into the insertion 24. This is illustrated in FIG. 4.4. Lastly, the bearing fingers 52 are axially displaced backwards, whereby the bearing fingers 52 can be displaced inside radially backward prior to the axial displacements. The ring is then finally mounted in the work piece opening, as illustrated in FIG. 5.

Figure 10:
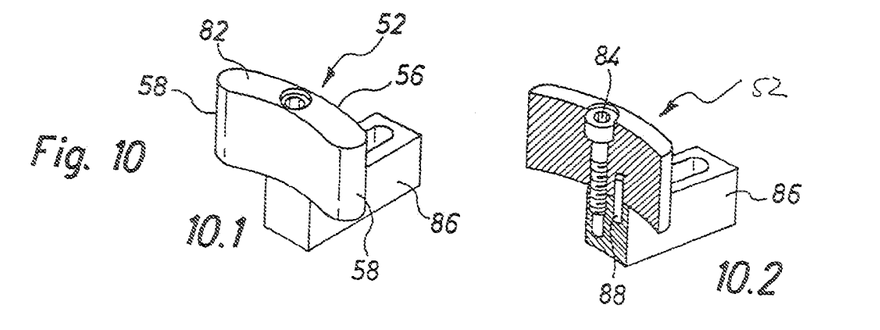

The kidney-shaped bearing fingers 52 that are used in FIG. 4 are illustrated in FIG. 10 as a single component.

Figure 5:
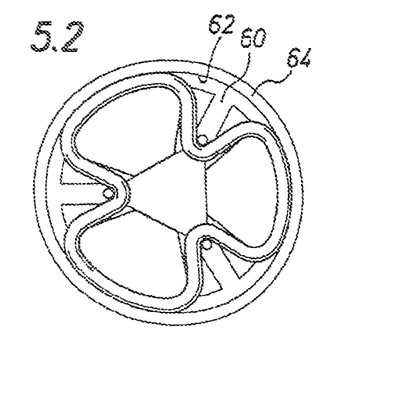
FIG. 5 sets forth various steps 5.1-5.7 of a second procedure for the inner mounting of a ring.
Figure 11:
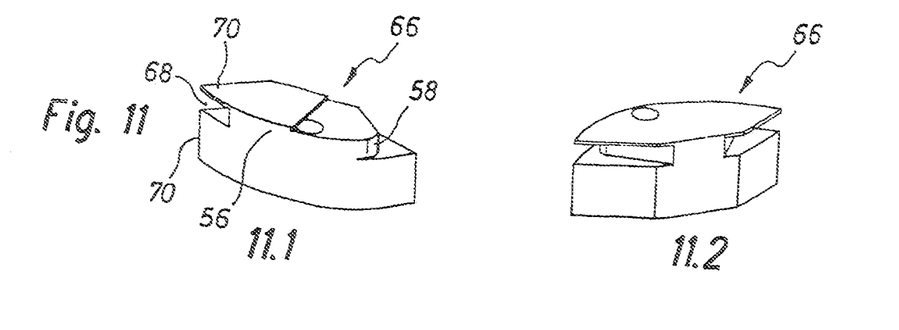

FIG. 5 illustrates another procedure for the inner mounting of the ring 10, whereby bearing fingers 66 are used as illustrated in FIG. 11. FIG. 5 shows the cross section through the bearing fingers 66 on the plane of the ring 10.

The procedural steps illustrated in FIG. 5.1-5.4 correspond to the steps according to FIG. 4.1-4.4. There is a difference in that, according to FIG. 5.4, during the axially backwards displacement of the forming fingers 54, the ring does not by itself come to a complete resting position at the inner wall 62. In order to ensure a complete abutting, the process according to FIG. 5.5 is as follows: the forming fingers 54 in their axially backwards displaced position are displaced radially inward and then axially forward into the ring plane. This is illustrated in FIG. 5.5. In another step according to FIG. 5.6, the forming fingers are displaced radially outwards in such a way, that the ring 10 makes contact at the inner wall 62 in the area of the forming fingers 54.

In the next step according to FIG. 5.7, the forming fingers 54 and the bearing fingers 66 are displaced radially inwards and finally axially backwards. The ring 10 is thereby finally mounted.

Figure 6:
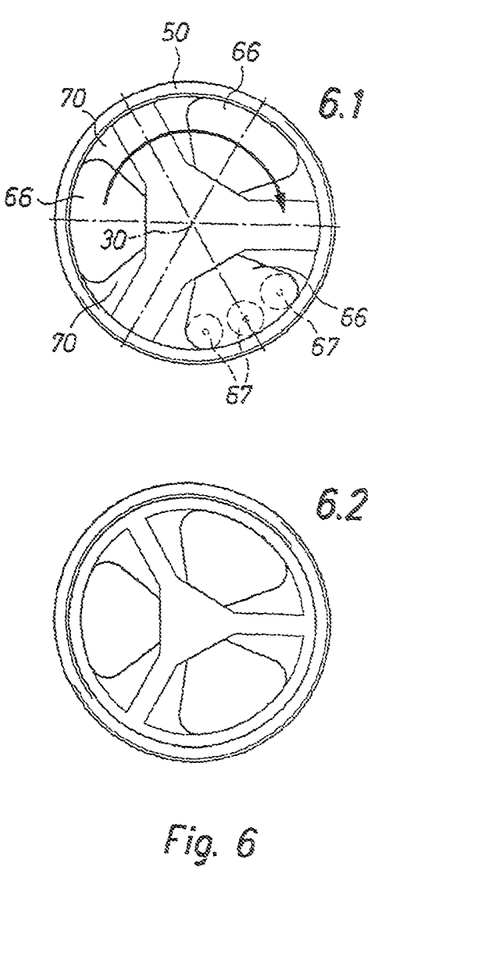
FIG. 6 sets forth alternative steps 6.1-6.2 of a procedure for the inner mounting of a ring according to FIG. 5.

Instead of the steps 5.5 and 5.6, it is also conceivable according to the present disclosure that the bearing fingers 66 are according to FIG. 6.1 axially displaced in relation to the median longitudinal axis 30.

This causes the ring 10 in its entirety to abut at the inner wall 62. In order to avoid any unwanted displacement of the ring 10 during axial displacement, it is possible according to the present disclosure, that roller elements 67, such as illustrated in FIG. 6.1, are present at the bearing fingers 66.

The step illustrated in FIG. 6.1 is followed by a step according to FIG. 6.2 in which the bearing fingers 66 are displaced radially inward and then axially backwards. The ring 10 is thereby finally mounted.

As illustrated in FIGS. 5, 6 and 11, the side sections 58 of the bearing fingers 66 have one groove-like recess 68 each, which is delimited in an axial direction by two side walls 70 that are positioned opposite one another. The cut plane illustrated in FIGS. 5 and 6 only shows the one sidewall 70 that is present inside the table. The design of the recess 68 or the sidewalls 70 prevents an axial slipping of the ring 10 with forming fingers 54, which are displaced radially inward, as illustrated in FIG. 5.2, 5.3. The ring 10 can while pre-tensioned hence be held around the abutting section and the side sections of the bearing fingers 66 without the possibility of the ring 10 slipping off.

As is further shown particularly in FIG. 5.1 and 5.2, the bearing fingers 66 exhibit a circular, segment-like contour in such a way that two bearing fingers, which are positioned adjacent to one another, each form a passage 72 in a radial direction, whereas the respective forming finger 54 can be displaced in a radial direction. The passage 72 is thereby, in a radially inward position of the bearing fingers 66, slightly wider than the respective forming fingers 54.

FIG. 7 illustrates how an outer mounting of a ring 10 on the outer wall of a work piece 74, for example a shaft, can occur. The ring is, according to FIG. 7.1, accepted by bearing fingers 28 and forming fingers 26, which are positioned in a radially inward direction opposite the ring.

According to FIG. 7.2, the forming fingers and the bearing fingers are displaced radially outward, so that the ring 10 is expanded. The ring 10 can then be placed around the outer wall of a work piece 70. The outer wall of a work piece 74 can thereby provide a recess 76, where a ring 10 should be inserted.

According to FIG. 7.3, the bearing fingers 28 are initially displaced axially backwards, so that the ring 10 in the area, where the bearing fingers 28 contacted the ring, makes contact with the outer wall of the work piece 74 and/or the recess 76. The forming fingers 26 are then in the final work step displaced axially backwards, so that the ring 10 reaches its final mounting position. This is illustrated in FIG. 7.4.

Figure 8:
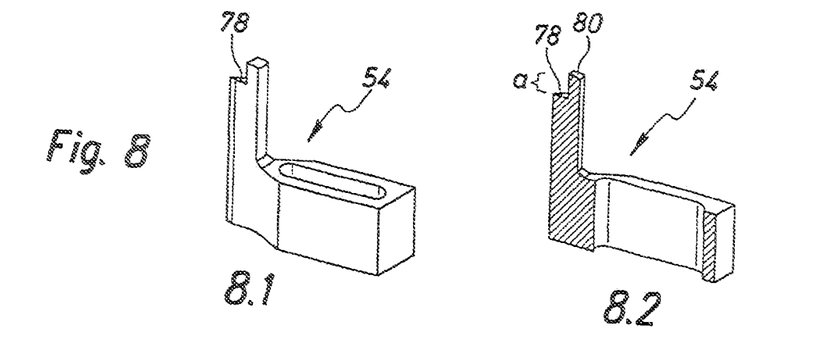
FIGS. 8-11 illustrate various fingers for a gripper device according to FIG. 1 or for the performing of a procedure according to FIGS. 4-7, respectively.

FIG. 8 illustrates a forming finger 54 for the inner mounting according to FIGS. 4, 5 and 6. FIG. 8.1 shows a perspective view; FIG. 8.2 shows a longitudinal cross section through the forming finger 54. It is clearly visible that the forming finger 54 provides a recess 78 that can serve to prevent an axial slipping of the ring 10. The space existing in an axially direction between recess 78 and the free abutting face 80 of the finger 54 is thereby equal to or slightly larger than the thickness of the ring 10.

Figure 9:
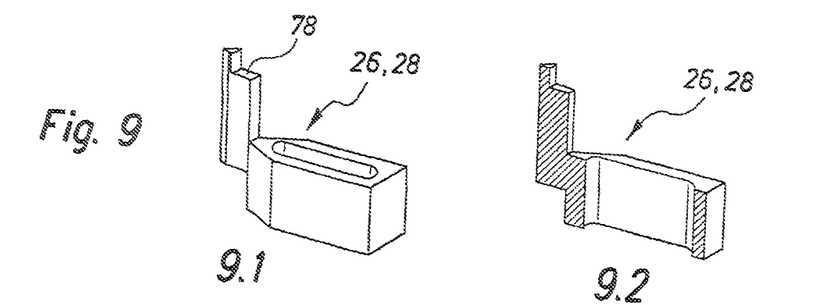

FIG. 9 illustrates a forming finger and/or a bearing finger 26, 28 for the outer mounting of the ring 10 according to FIG. 7. The forming finger 26 as shown in FIG. 9 can thereby be identical to the bearing finger 28 that is utilized in FIG. 7. The finger 26, 28, which is illustrated in the perspective view, incorporates a recess 78 corresponding to finger 54 according to FIG. 8. FIG. 9.2 shows a longitudinal cross section through the finger 26, 28. Since the finger 26, 28 is utilized for the inner mounting of the ring 10, the recess is positioned on the radial outward side of the finger. The recess 78 of the finger 54 is in contrast positioned on the radial inward side of the finger, since this finger 54 is utilized for the outer mounting, which means gripping the ring.

FIG. 10 shows the bearing finger 52 as illustrated in FIG. 4. The finger 52 thereby provides a kidney-shaped attachment 82, which is fastened to a basic body 86 of the finger with a setscrew 84. The attachment 82 provides on its radial outward side the abutting section 56, which merges tangentially into the two side sections 58. In order to prevent an unwanted turning of the attachment 82 in relation to the basic body 86, a safety pin 88 is provided between the attachment body and the basic body 86, which is illustrated in the segment according to FIG. 10.2.

FIG. 11 shows the bearing finger 66 illustrated in FIG. 5.6, which manifests a circular contour in a top view. Noticeable is a recess 68, which is delimited in an axial direction by the sidewalls 70. The recess 68 is thereby only provided in the area of the side sections 58, so that a slipping of the ring in an axial direction is possible when the ring is abutting the inner wall.

A sidewall 70 has been cut away in FIG. 11.1 to illustrate the tangential transition area from the abutting section 56 to the side section 58.

The fingers in the surface area, where the ring is abutting, are round or curved as depicted in particular in FIGS. 4 through 7 and 8 through 11.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A gripper device for mounting rubber elastic rings on at least one of an inner wall of a work piece opening and on an exterior of a work piece with a basic housing and with forming jaws and bearing jaws, whereby the forming jaws and the bearing jaws are displaced in relation to the basic housing wherein the individual forming jaws and the individual bearing jaws are respectively coupled to one another in such a way that the forming jaws are displaced independently of the bearing jaws and the bearing jaws are displaced independently of the forming jaws in a radial direction in at least one of toward and away from one another, the gripper device further comprising an axially displaceable plate element on which jaw guides are positioned for at least one of the forming jaws and the bearing jaws to guide said jaws in the radial direction in at least one of toward and away from one another, wherein to displace the plate element together with the jaws that are located on said element in an axial direction, the element is provided with a piston which engages in a piston cylinder in the basic housing, wherein the jaws that are located on the plate element are mechanically coupled by means of a common actuator to displace the jaws in the jaw guides in the radial direction, wherein said actuator is driven by an actuator piston that is located in the piston.

2. The gripper device according to claim 1, characterized in that the piston comprises an actuator cylinder that receives the actuator piston.

3. The gripper device according to claim 2, characterized in that the piston comprises a piston rod, which is at least sectionally sleeve-like, open on one side and forms the actuator piston.

4. The gripper device (10) according to claim 1, characterized in that the plate element (18) has a guide opening (29) for the actuator piston (25), its actuator piston rod (21) and/or for the actuator (24) connected with the actuator piston (25).

5. The gripper device (10) according to claim 1, characterized in that the actuator (24) is mechanically coupled through setting levers (31) or pulls with the respective jaws that are positioned on the plate element (18).

6. The gripper device (10) according to claim 1, characterized in that the jaws, which are not positioned on the plate element (18), are respectively coupled to one another through setting levers (35) or pulls with a pressure pin (37) that can be displaced in an axial direction.

7. The gripper device (10) according to claim 6, characterized in that the pressure pins (37) can be displaced by means of commonly controlled pressure pin pistons (39) in an axial direction.

8. The gripper device (10) according to claim 6, characterized in that the pressure pins (37) comprise adjustment threading sections (38) in such a way, that when turning the actuators, where the adjustment threading sections (38) are mounted, the axial length of the pressure pins (37) is adjusted and thus a linear adjustment can be achieved.

9. The gripper device (10) according to claim 8, characterized in that the actuators each have an outer pinion (41) and that the outer pinions (41) can be jointly adjusted by a setting ring (43), which combs across the outer pinion (41) and has a setting ring (43) with a particular gearing.

* * * * *